G. PHILLIPS.
Running Gears for Wagons.

No. 143,249. Patented September 30, 1873.

Witnesses.

Inventor
G. Phillips
by his Attys

UNITED STATES PATENT OFFICE.

GARDINER PHILLIPS, OF AUGUSTA, MAINE.

IMPROVEMENT IN RUNNING-GEARS FOR WAGONS.

Specification forming part of Letters Patent No. 143,249, dated September 30, 1873; application filed May 7, 1873.

*To all whom it may concern:*

Be it known that I, GARDINER PHILLIPS, of Augusta, in the county of Kennebec and State of Maine, have invented a new and useful Improvement in Draft-Wagons; and I do hereby declare the following to be a full and exact description of the same, reference being had to the accompanying drawings forming part of this specification, in which—

Figure 1:
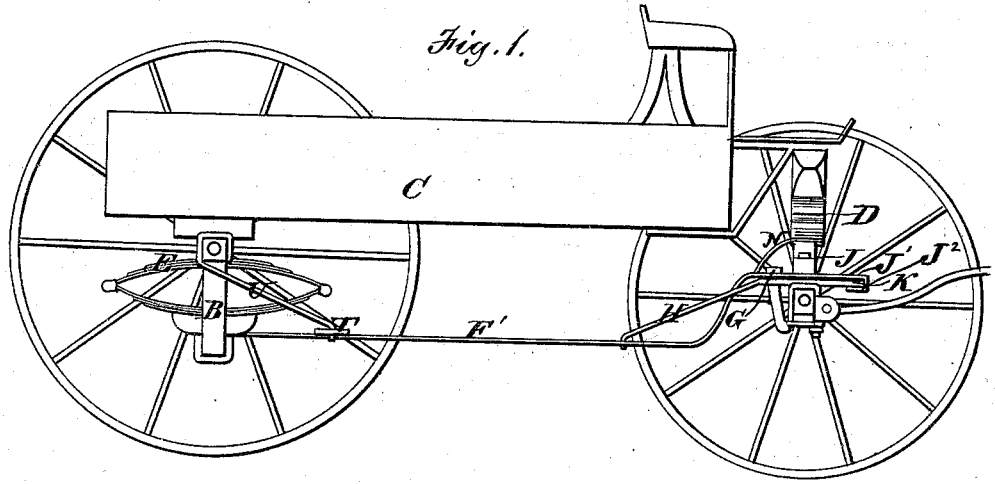
Figure 2:
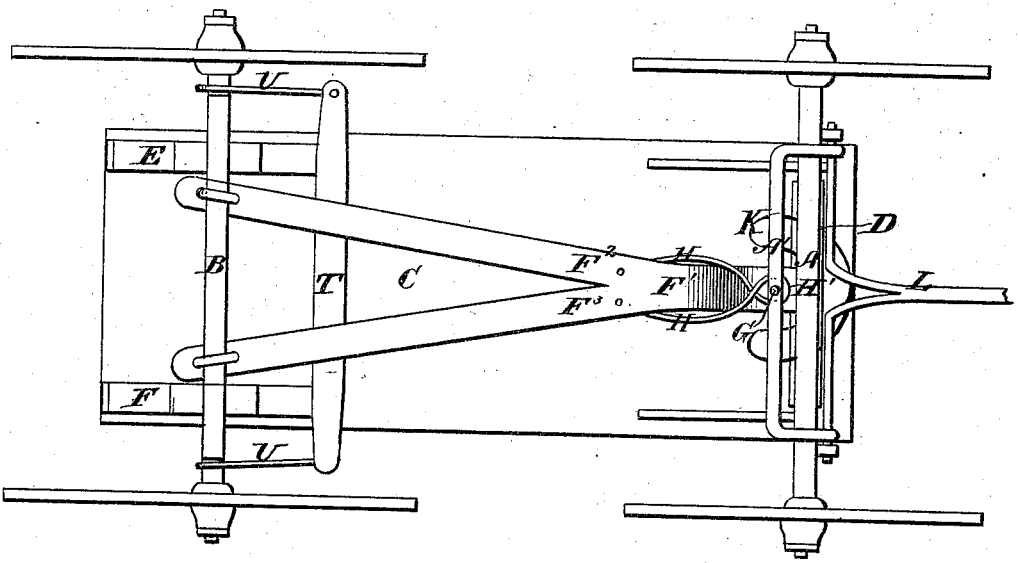

Figure 1 is a side elevation, showing my improved wagon with two wheels removed; and Fig. 2, a bottom view.

Similar letters of reference in the accompanying drawings denote the same parts.

This invention belongs to that class of draft-wagons whose rear ends are supported upon crank-axles in order that they may be sufficiently low to be loaded with ease, its object being to provide a strong and safe attachment between the rear and front axles of a draft or "jigger" wagon, and an attachment that will enable the body of the wagon to rest upon springs at both ends, and, at the same time, be sufficiently low for loading heavy articles. To this end the invention consists in the peculiar construction of the reach connecting the front and rear axles, and the attachment of the same to the front axle. Said reach is bifurcated at its rear end, and rigidly attached to the rear axle. The latter is in crank form in order to lower the body, while the front end of the reach is bent upward and attached to the bolster and king-bolt of the front axle, as I will now proceed to describe.

In the accompanying drawing, A is the front axle, and B the rear axle, the latter being in crank form. Between the body C of the wagon and these two axles are interposed elliptical springs D E F, the former extending lengthwise of the axle, and the two latter extending lengthwise of the body and crosswise of the axle. $F^1$ is a bifurcated reach connecting the two axles, the forks $F^2$ $F^3$ being fastened to the rear axle by means of clips, and the reach being bent upward at its front end, and jointed upon the bolt G, by which said reach is connected with an attachment, A', made fast to the rear side of the front axle. Rods H are connected, at their rear ends, with the reach $F^1$, and extending thence in a direction inclined upward to an eye, H', at the front end of the rods H, which eye encircles the king-bolt G. The spring D is fastened upon a bolster, J, which is secured to the front end of the bar $F^1$, so that the spring D oscillates with the body when it turns on the king-bolt. The front end of the reach $F^1$, where it is attached to the bolster J, is provided with a segmental plate, $J^1$, which, in connection with a similar plate, K, attached to the top of the axle A, constitutes the fifth-wheel. The plate $J^1$ has a lug, $J^2$, which is bent under the plate K, as shown in Fig. 1. N represents a brace extending from the bent portion of the reach $F^1$ to the upper side of the bolster.

This connection of the reach to the axles is extremely secure and strong, allowing the body to be located sufficiently low to be easy of access. The bifurcated rear ends of the reach enable it to be attached, at two points, to the rear axle; and its connection is additionally strengthened by a transverse bar, T, attached to the reach, and rods U, extending from the ends of the bar T to the rear axle, as shown.

I claim as my invention—

1. The reach $F^1$, bifurcated at its rear end, bent upward at its front end, in combination with the rear crank-axle B and front axle A, substantially as and for the purposes specified.

2. The reach $F^1$, bent upward at its forward end, and attached, by the bar T and rods U, to the rear axle, by the braces H and eye H' to the king-bolt, and by the segmental plate J and brace N to the bolster, substantially as described.

3. The combination of the segmental plate $J^1$, formed on the end of the reach $F^1$, and provided with the bent lug $J^2$, with the corresponding plate K on the axle A, substantially as and for the purposes specified.

GARDINER PHILLIPS.

Witnesses:
EUGENE W. WHITEHOUSE,
E. N. GRAY.